United States Patent
Golovashchenko

(10) Patent No.: US 8,739,590 B2
(45) Date of Patent: Jun. 3, 2014

(54) ELECTRO-HYDRAULIC FLANGING AND TRIMMING

(75) Inventor: Sergey Fedorovich Golovashchenko, Beverly Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1053 days.

(21) Appl. No.: 12/352,624

(22) Filed: Jan. 13, 2009

(65) Prior Publication Data
US 2010/0175447 A1    Jul. 15, 2010

(51) Int. Cl.
*B21D 26/021* (2011.01)

(52) U.S. Cl.
USPC ...................... 72/55; 72/60; 72/706

(58) Field of Classification Search
USPC ............ 72/54, 55, 60, 706, 453.12, 453.11, 72/453.01, 332, 334, 338; 29/421.11, 29/421.12
See application file for complete search history.

(56) References Cited

U.S. PATENT DOCUMENTS

| | | | |
|---|---|---|---|
| 3,267,780 A | 8/1966 | Roth | |
| 3,394,569 A * | 7/1968 | Smith | 72/56 |
| 3,495,486 A | 2/1970 | Fuchs, Jr. | |
| 3,631,700 A * | 1/1972 | Kosaka | 72/56 |
| 3,640,110 A * | 2/1972 | Inoue | 72/56 |
| 3,786,662 A | 1/1974 | Roth | |
| 5,070,717 A | 12/1991 | Boyd et al. | |
| 5,217,637 A * | 6/1993 | Balzer | 252/73 |
| 5,445,001 A | 8/1995 | Snavely | |
| 5,992,488 A | 11/1999 | Bortolini | |
| 6,591,649 B1 * | 7/2003 | Gafri et al. | 72/56 |
| 6,708,542 B1 | 3/2004 | Gafri et al. | |
| 6,865,917 B2 | 3/2005 | Golovashchenko et al. | |
| 6,928,848 B2 | 8/2005 | Golovashchenko et al. | |
| 7,155,948 B2 | 1/2007 | Hellgren | |
| 2007/0084261 A1 | 4/2007 | Golovashchenko | |
| 2008/0134741 A1 | 6/2008 | Golovashchenko et al. | |

* cited by examiner

*Primary Examiner* — Edward Tolan
*Assistant Examiner* — Pradeep C Battula
(74) *Attorney, Agent, or Firm* — Damian Porcari; Brooks Kushman P.C.

(57) ABSTRACT

A method of flange trimming a sheet metal panel to form a part including flanges for subsequent hemming or weld operation is disclosed. The method utilizes an electro-hydraulic forming (EHF) tool to form a channel within which a flange is cut out in a trimming operation. A combined flange/trim die may be provided in which both a channel forming operation and a flange trimming operation may be performed. A manufacturing system for fabricating a part by forming a channel in a peripheral portion and cutting the channel area to form a flange. The method also relates to a die for an EHF tool that defines a channel-shaped recess and has a trim edge for cutting a flange into the channel.

7 Claims, 3 Drawing Sheets

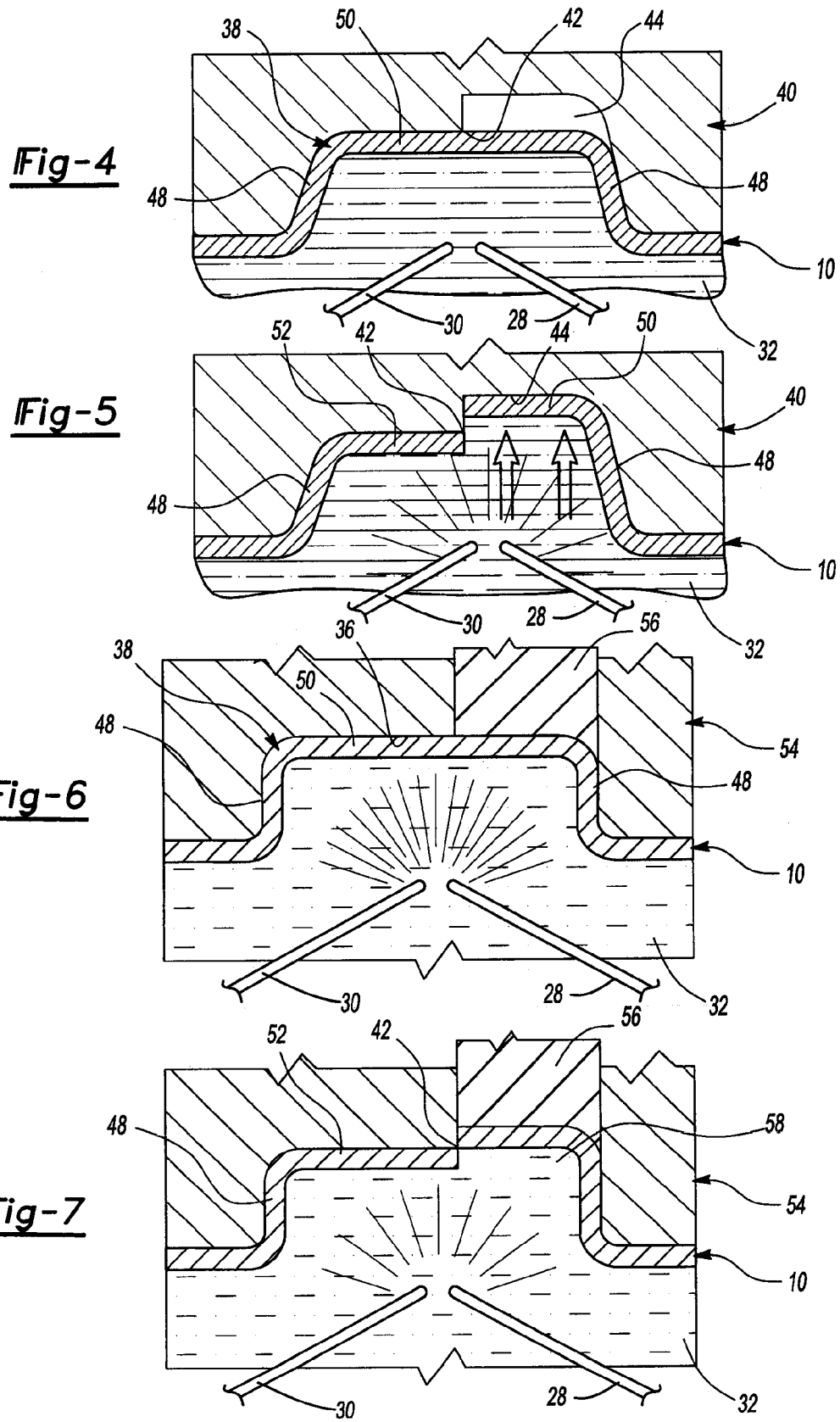

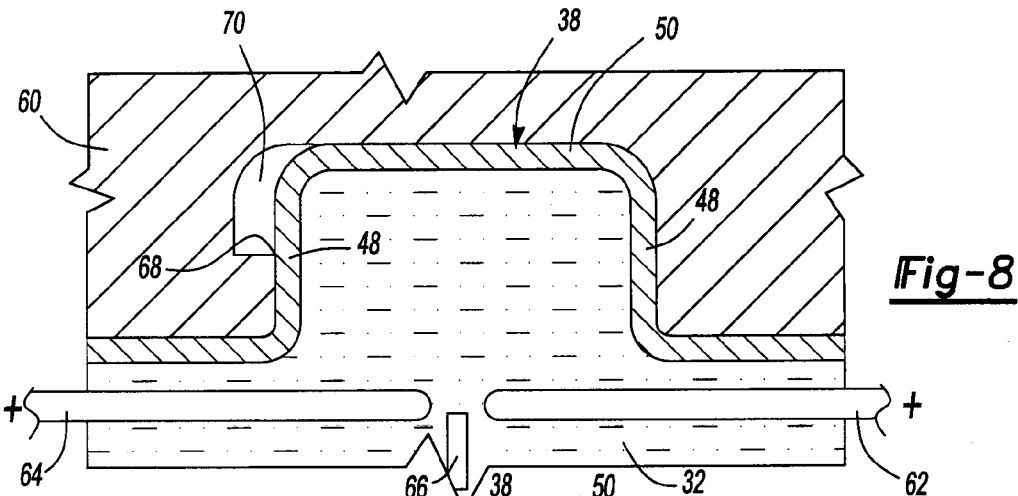
*Fig-8*
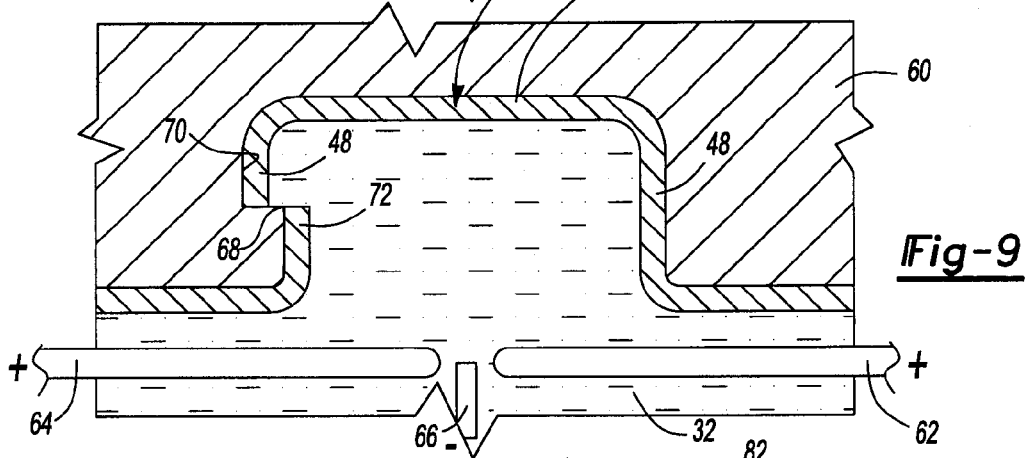
*Fig-9*
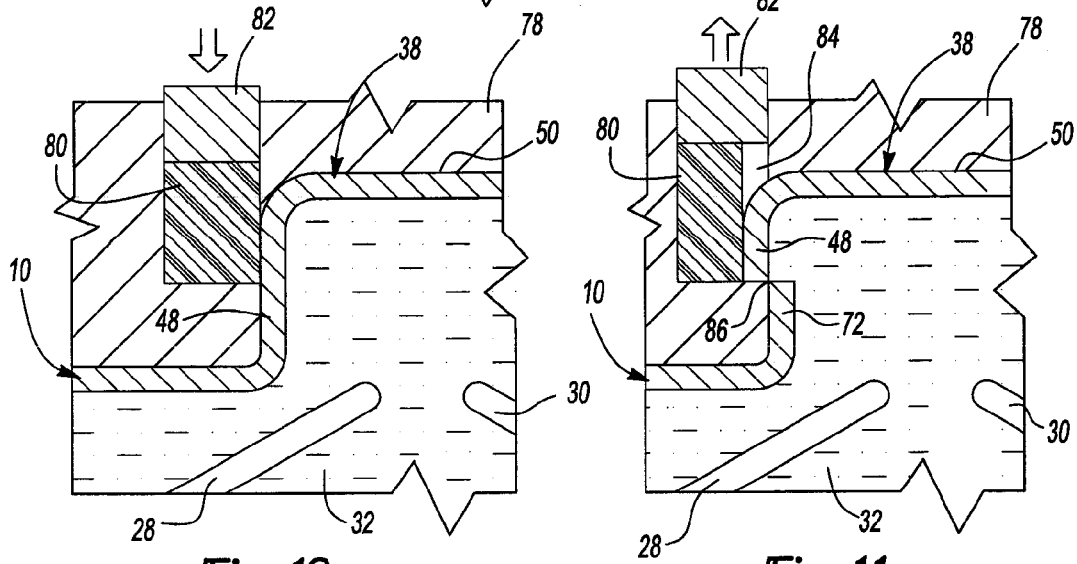
*Fig-10*  *Fig-11*

ELECTRO-HYDRAULIC FLANGING AND TRIMMING

BACKGROUND

1. Field of the Invention

The present invention relates to sheet metal manufacturing processes that include trimming and flanging sheet metal parts.

2. Background Art

Sheet metal manufacturing processes are used to manufacture interior panels, exterior panels and other structural parts of manufactured products. Sheet metal manufacturing processes originally focused on manufacturing parts from mild steel. Mild steel is a preferred material for sheet metal manufacturing processes because of its favorable material properties that allow parts to be drawn, formed, flanged, trimmed and welded relatively easily.

In an effort to increase strength and reduce the weight of some sheet metal parts, such as those used in the manufacture of vehicles, considerable effort has been devoted to using light-weight, high performance materials. Examples of such light-weight materials include Bakehardenable Steels, Dual Phase Steels, Boron Steels and high strength aluminum alloys. Unfavorable material properties of these high strength, light-weight materials pose a wide variety of technological problems for conventional sheet metal forming processes.

One problem area encountered when using high strength, light-weight materials in sheet metal forming processes relates to the trimming operation. Trimming, as used herein, refers to shearing off extra material from a drawn panel. In many instances, especially when the geometry of a part being trimmed is rather complicated, it may be necessary to perform two trimming operations. Conventional trimming dies usually incorporate an upper trim steel and a lower trim steel that shear extra material from the drawn panel while the panel is retained on the lower die by a clamping pad that holds the panel against the lower trim steel cutting member.

Advanced high strength steels require applying substantially greater forces to the trimming dies. In conventional trimming dies, clearance between the upper trim steel and lower trim steel should be less than 10% of the material thickness. However, with advanced high strength steel and aluminum, visible burrs may be formed which typically indicates that the die has excessive clearance. Burrs may form even if the die is manufactured to the normal clearance of less than 10% of the blank thickness if the die has insufficient stiffness against expanding the clearance between shearing edges driven by trimming forces. Trimming advanced high strength steels and aluminum may also result in increased die wear and, more specifically, increased wear of the trimming edges of the upper and lower trim steels. Wear may also add to increased clearance, decreased sharpness and other problems relating to the trim operation.

Another problem relating to sheet metal forming operations on less ductile advanced high strength steel and aluminum alloys relates to the reduced formability as it impacts flanging operations. Splits emanating from a trimmed surface may be created during a stretch flanging operation. Stretch flanging operations can also be adversely impacted by reduced sharpness of trim die tool steel. To address this issue, it has been proposed to combine trimming operations and one flanging operation in one electro-hydraulic forming (EHF) tool. However, this approach does not eliminate the issue of stretch flange splitting especially after the trim steels become worn, splits may subsequently occur in the flanging operation. Another problem encountered when the panels are trimmed and then flanged may include generation of wrinkles in transition zones and waviness of the flange. Transition zones may be created when sequential discharges of the EHF tool are required to trim and flange the part.

The trim die may require a cam-driven trimming tool if a large cutting angle is required. Cam-driven trimming tools make the trim die more expensive and require additional maintenance. Trim dies must be maintained by resharpening the trim steel edges or by compensating for wear by shimming the trim steels. The trim die may require adjustment to prevent or eliminate splits created in stretch flanging operations. Trimmed parts may require additional metal finishing if the material forms slivers or localized splits created along a trimmed edge during subsequent stretch flanging operations.

These and other problems are addressed by Applicant's development of an improved sheet metal manufacturing process.

SUMMARY

According to one aspect of the present development, sheet metal parts are formed initially in a drawing operation. After the part is drawn to the desired shape, a channel is then formed around the periphery of the drawn part. Following the formation of the channel, the partially formed part is placed in an EHF tool for a trimming operation to trim flanges of the parts in the channel. Parts of the panel outboard of the flanges are trimmed from the panel.

The channel forming operation may be performed subsequent to drawing. The drawing operation may be a conventional drawing operation or may be an EHF operation. Similarly, the channel forming operation may be performed in a conventional forming die or may be performed in an EHF operation.

The electro-hydraulic trimming operation is performed in a one-sided die that has a single set of sharp trim steels in areas where the trimming operation is to be performed. Generally, the trimming operation is performed around the entire periphery of the panel. The trimming operation may be performed in a single step or may be performed by a series of sequential discharges of the EHF trimming machine, especially if the size of the area to be trimmed is substantial.

According to another aspect of the development, a method is provided for making a sheet metal part from a blank of sheet metal. The method includes the steps of drawing the blank of sheet metal to form a partially formed sheet metal panel including a part-shaped portion within a peripheral edge portion that is provided around at least part of the part-shaped portion. A flange is formed in a first part of the peripheral edge portion. The partially formed sheet metal part is then placed into a one-sided trim die of an EHF trimming machine. The trim die has at least one trim steel that provides the cutting edge for the trimming operation. An EHF trimming machine is discharged to trim a second portion of the peripheral edge portion from the first part after the flange is formed by shearing the partially formed sheet metal part with the trim steel.

According to another aspect of the present invention, a manufacturing system is provided for fabricating a part from a sheet metal blank. The manufacturing system comprises a part forming tool for forming the blank into a part-shaped portion and a peripheral portion. A flange forming tool forms the peripheral portion into a flange area and an offal, or scrap, area. An EHF trim tool including a one-sided die, a vessel that contains a fluid, and at least two electrodes disposed in the fluid that are electrically connected to a capacitor circuit. The capacitor circuit provides a high voltage pulse of electrical energy to the electrodes that creates a shockwave in the fluid. The shockwave drives the peripheral portion of the blank into engagement with the one-sided die to trim the offal area from the flange area.

According to another aspect of this development, a one-sided die for an electro-hydraulic forming tool is provided in which a channel is first formed and then trimmed to create a flange on a sheet metal part. The die defines a channel-shaped recess in which a channel is formed about a shaped part in a sheet metal blank. A trim edge is provided in the channel-shaped recess and an insert is assembled to the die adjacent to the trim edge to partially define the channel-shaped recess. The insert is moved to a recessed position in the die to expose the trim edge for cutting a flange from the channel. The insert may be formed of an elastomeric material or may be a movable steel insert.

These and other aspects of Applicant's development will be better understood in view of the attached drawings and the following detailed description of the illustrated embodiments.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

FIG. 4 is a fragmentary diagrammatic view of an EHF trim tool set-up to trim a weld flange in the channel;

FIG. 5 is a fragmentary diagrammatic view of an EHF trim tool after a discharge trims the weld flange in the channel formed in FIG. 4;

FIG. 6 is a fragmentary diagrammatic view of an EHF flange/trim tool forming a channel in a sheet metal panel;

FIG. 7 is a fragmentary diagrammatic view of an EHF flange/trim tool trimming a weld flange in the channel formed in FIG. 6;

FIG. 8 is a fragmentary diagrammatic view of a flange/trim tool forming a channel in a sheet metal panel;

FIG. 9 is a fragmentary diagrammatic view of an EHF flange/trim tool trimming a hem flange in the channel formed in FIG. 8;

FIG. 10 is a fragmentary diagrammatic view of an EHF flange/trim tool forming a channel in a sheet metal panel; and FIG. 11 is a fragmentary diagrammatic view of an EHF flange/trim tool trimming a channel in the channel formed in FIG. 10.

DETAILED DESCRIPTION

Figure 1:
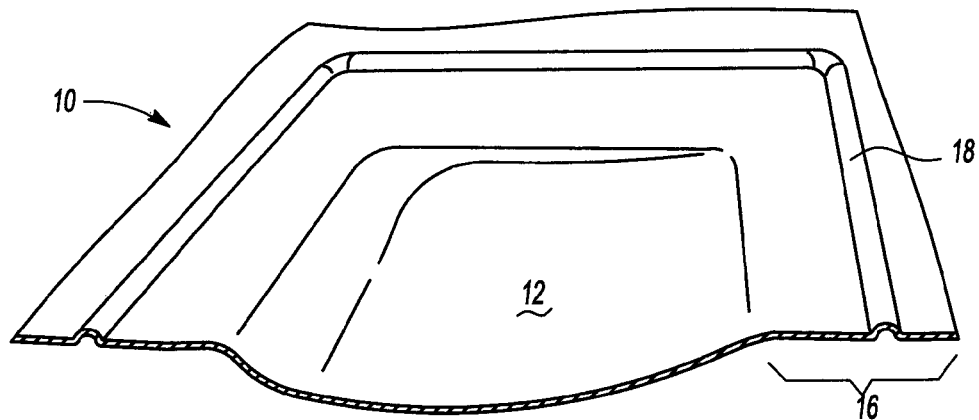
FIG. 1 is a fragmentary perspective view of a sheet metal panel that has a part portion that is drawn to a part shape and a peripheral area outboard of the part portion.

Referring to FIG. 1, a sheet metal panel 10 is shown to include a part-shaped portion 12 that is surrounded by a peripheral edge portion 16. The sheet metal panel 10 may be formed of mild steel, high strength steel or aluminum alloy. A blank of the sheet metal is initially formed in a drawing operation to the shape illustrated in FIG. 1. The panel may be drawn in a conventional draw press or may be formed by an electro-hydraulic forming process. A draw bead 18 is shown in FIG. 1 in the peripheral edge portion 16. The draw bead 18 serves to hold the blank in the peripheral edge portion 16 while the part-shaped portion 12 is drawn into the sheet metal panel 10.

Figure 2:
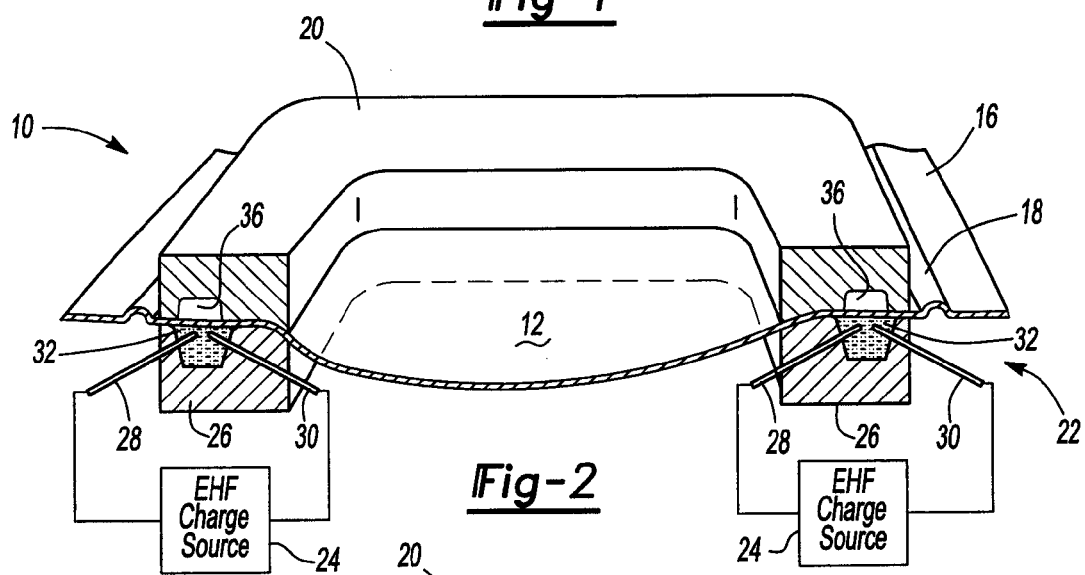
FIG. 2 is a perspective cross-sectional view of an EHF tool set-up to form a channel in a sheet metal panel.

Referring to FIG. 2, a one-sided electro-hydraulic forming (EHF) die 20 that is used with an EHF tool is generally indicated by reference numeral 22. Only part of the EHF tool 22 is shown. An EHF charge source 24 is a capacitive charge storing device that is discharged to provide the electro-hydraulic discharge that may be used to form or trim the sheet metal panel 10. Other components of the EHF tool 22 include a vessel 26 in which a first electrode 28 and a second electrode 30 are disposed in a spaced relationship. A volume of fluid 32 is provided within the vessel 26 and separates the first and second electrodes 28, 30. When the EHF charge source 24 is discharged, the first and second electrodes 28 and 30 arc across the gap between their end through the fluid 32 which creates a powerful shockwave in the fluid 32 that is sufficient to form or cut the sheet metal panel 10.

The one-sided die 20 defines a channel shaped recess 36 that is placed over the vessel 26. The channel-shaped recess 36 is located on the opposite side of the peripheral edge portion 16 of the sheet metal panel 10 from first and second electrodes 28 and 30 in the vessel 26.

Figure 3:
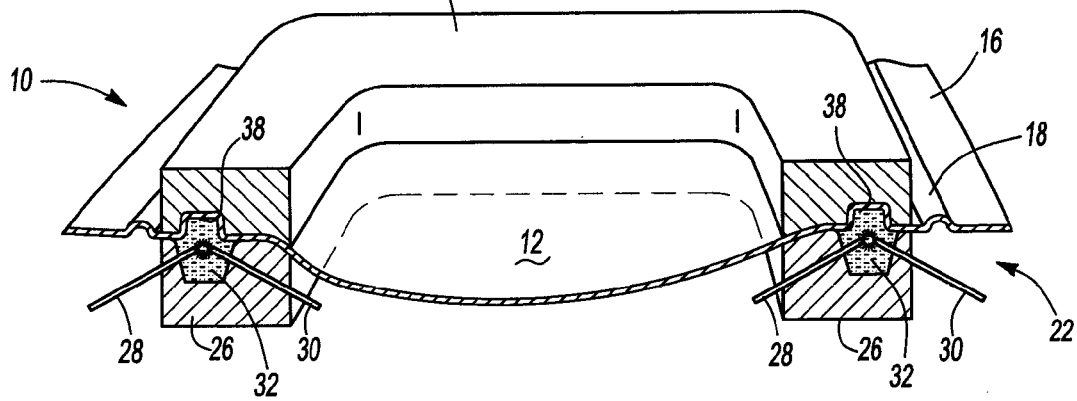
FIG. 3 is a perspective cross-sectional view of an EHF forming tool after a discharge forms the channel in the sheet metal panel.

Referring to FIG. 3, the sheet metal panel 10 is shown in the one-sided EHF die 20 after discharge of the EHF tool 22. The peripheral edge portion 16 is driven into the channel shaped recess 36 in the one-sided EHF die 20. A channel 38 is formed within the channel shaped recess 36 upon discharge of the EHF charge source 24 (shown in FIG. 2). The EHF charge source 24 is only shown in FIG. 2, but it should be understood to be connected to the electrode shown in FIG. 3 and in the other views of the alternative embodiments disclosed below.

Referring to FIG. 4, a one-sided EHF trim die 40 is illustrated that includes a cutting edge 42. The cutting edge 42 is preferably formed by a tool steel insert that is secured to the EHF trim die 40 to improve durability. However, the cutting edge 42 could also be provided as an integral sharp edge defined by the trim die 40 as illustrated. A recess 44 is provided adjacent to the cutting edge 42 to provide relief for the trimming operation. The sheet metal panel 10 is partially shown with the previously formed channel 38 shown as received in the trim die 40. The channel 38 includes two side walls 48 that are interconnected by a base wall 50. As shown in FIG. 4, the channel 38 is in place in the die 40 and the first and second electrodes 28 and 30 are disposed in the fluid 32 in the vessel (as shown in FIGS. 2 and 3).

Referring to FIG. 5, the trim die 40 is shown after the EHF tool 22 is discharged between the first and second electrodes 28 and 30 in the fluid 32. The fluid 32 exerts force on the panel 10 to cut the base wall 50 to form a weld flange 52 by driving part of the base wall 50 into the recess 44.

Referring to FIG. 6, an alternative embodiment is shown wherein a one-sided flange/trim die 54 is shown to include a movable insert 56. The sheet metal panel 10 is disposed in the one-sided flange/trim die 54 with the channel 38 including the side walls 48 and the base wall 50 driven into contact with the one-sided die 54 to form the channel 38. The electrodes 28 and 30 are shown after discharge in which the channel 38 is formed into the channel-shaped recess 36. The insert 56 is shown flush with the channel-shaped recess 36, and the channel 38 is formed against the channel-shaped recess 36 and the insert 56.

Referring to FIG. 7, a trimming operation is illustrated in conjunction with the one-sided flange/trim die 54. After the channel 38 has been formed, as shown in FIG. 6, the EHF tool 22 is subsequently discharged to perform the trimming operation. The insert 56 is retracted to provide a recess 58 between the base wall 50 of the channel 38 and the insert 56. The EHF tool 22 is discharged through the electrodes 28 and 30 creating a shockwave within the fluid 32 that drives a portion of the base wall 50 into the recess 58. A weld flange 52 is formed when the base wall 50 is trimmed against the cutting edge 42.

Referring to FIG. 8, an alternative embodiment of a one-sided flange/trim die 60 is shown that sequentially discharges the EHF tool 22. The EHF tool 22 includes a first stage electrode 62, a second stage electrode 64 and a ground 66. The EHF tool is connected to the first stage electrode 62, second stage electrode 64 and ground 66 so that an EHF discharge may occur between the first stage electrode 62 and the ground 66 to partially form the channel 38 in the flange/trim die 60.

Referring to FIG. 9, the successive discharge between the second stage electrode 64 and ground 66 is used to perform a trimming operation. A cutting edge 68 is provided adjacent to a recess 70, as shown in FIGS. 8 and 9. The discharge between the second stage electrode 64 and the ground 66 drives a portion of the side wall 48 into the recess 70. A hem flange 72 is formed by the remainder of the side wall 48 when the EHF tool 22 is discharged between the second stage electrode 64 and the ground 66.

Referring to FIG. 10, an alternative embodiment comprising a one-sided flange/trim die 78 is shown with the channel 38 being formed into the flange/trim die 78. An elastomeric insert 80 is received within the flange/trim die 78, and pressure is applied by a pressure foot 82 that compresses the elastomeric insert 80 to form a portion of the flange/trim die 78 against which the sheet metal panel 10 is formed. The EHF tool provides a stored charge from the EHF charge source 24 (not shown in FIG. 10) that is similar to the arrangement of FIGS. 2-7 above. The discharge travels through the fluid 32 to form the channel 38 including the side wall 38 and base wall 50.

Referring to FIG. 11, the trimming operation is illustrated that is performed after the channel forming operation shown in FIG. 10. The trimming operation may be performed by withdrawing the pressure foot 82 and relieving pressure on the elastomeric insert 80 to create a recess 84 that is located adjacent to the cutting edge 86. As shown in FIG. 11, the EHF tool 22 again discharges through the first and second electrodes 28 and 30 to drive the side wall 48 against the cutting edge 86 with part of the side wall being driven into the recess 84. The other part of the side wall forms a hem flange 72 on the sheet metal panel 10.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed:

1. A method of flanging and trimming a sheet metal panel including a part shaped portion disposed inside a peripheral edge portion, comprising:
   placing the panel in a one-sided flange forming die in a first electro-hydraulic forming (EHF) machine;
   discharging the first EHF machine to form a channel in the peripheral edge portion in a first operation wherein the channel includes at least one side wall that extends in a transverse direction relative to the peripheral edge portion and a base wall that is offset relative to the peripheral edge portion; and
   trimming the panel within the channel in a one-sided trimming die in a second operation in a second EHF machine to trim a flange in the previously formed channel.

2. The method of claim 1 wherein the steps of forming the channel and trimming the panel are both performed in a one-sided die that has a movable insert that provides a forming surface in a first location, wherein the method further comprises moving the insert to a second location to provide a recess that is adjacent to a cutting edge and discharging the EHF machine to force the panel against the cutting edge to trim the panel.

3. The method of claim 2 wherein the insert is an elastomeric member and the step of forming a channel also includes compressing the elastomeric member.

4. The method of claim 1 wherein the side wall is cut in the trimming step to form a hem flange.

5. The method of claim 1 wherein the base wall is cut in the trimming step to form a weld flange.

6. The method of claim 1 wherein the side wall is cut in the trimming step to form a hem flange.

7. The method of claim 1 wherein the first EHF machine includes an EHF tool and the one-sided flange forming die, in combination, and the second EHF machine includes the EHF tool and the one-sided trimming die, in combination.

\* \* \* \* \*